United States Patent
Marc et al.

(10) Patent No.: US 7,883,117 B2
(45) Date of Patent: Feb. 8, 2011

(54) LOCKING DEVICE AND A LINE FITTING PROVIDED THEREWITH

(75) Inventors: Jean Pierre Marc, Nangis (FR); Bernard Barre, Alfortville (FR)

(73) Assignee: JPB Systeme, Brie-Comte-Robert (FR)

( * ) Notice: Subject to any disclaimer, the term of this patent is extended or adjusted under 35 U.S.C. 154(b) by 755 days.

(21) Appl. No.: 10/562,682

(22) PCT Filed: Jun. 17, 2004

(86) PCT No.: PCT/FR2004/001497
§ 371 (c)(1),
(2), (4) Date: Dec. 28, 2005

(87) PCT Pub. No.: WO2005/015071
PCT Pub. Date: Feb. 17, 2005

(65) Prior Publication Data
US 2006/0151994 A1    Jul. 13, 2006

(30) Foreign Application Priority Data
Jul. 1, 2003 (FR) .................. 03 07939

(51) Int. Cl.
*F16L 15/00* (2006.01)

(52) U.S. Cl. .................. 285/86; 285/92; 285/354; 285/386

(58) Field of Classification Search .................. 285/86, 285/92, 322, 354, 386–387
See application file for complete search history.

(56) References Cited

U.S. PATENT DOCUMENTS

| | | | | | |
|---|---|---|---|---|---|
| 1,069,146 | A | * | 8/1913 | Kennedy | 285/86 |
| 1,580,694 | A | * | 4/1926 | Smith | 251/89.5 |
| 1,691,599 | A | * | 11/1928 | Zimmermann | 220/288 |
| 3,077,330 | A | * | 2/1963 | Lampbear | 251/89.5 |
| 5,188,398 | A | * | 2/1993 | Parimore et al. | 285/39 |
| 5,348,349 | A | * | 9/1994 | Sloane | 285/92 |
| 5,851,035 | A | * | 12/1998 | Marc et al. | 285/86 |
| 6,293,595 | B1 | * | 9/2001 | Marc et al. | 285/92 |

* cited by examiner

*Primary Examiner*—Aaron Dunwoody
*Assistant Examiner*—Fannie Kee
(74) *Attorney, Agent, or Firm*—Young & Thompson

(57) ABSTRACT

A locking device (1) is fixed to a nut (4) and includes a coupling unit (42) insertable into a hexagonal configuration (11) of a spigot end (2) at a reduced axial distance being coupled by mutually interpenetrable gears (49, 51) with a stop unit (38) which axially slides in a body (18) opposite to a compression spring (36). The gears (49, 51) are symmetric and are insertable into each other with a predetermined elastic resistance by the action of compression or loosing torque. The device is embodied in one piece which is mounted by assembling with the nut without affecting the spigot ends (2, 3).

14 Claims, 2 Drawing Sheets

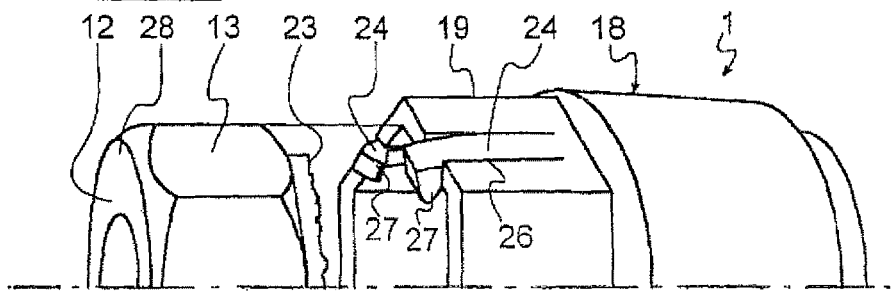
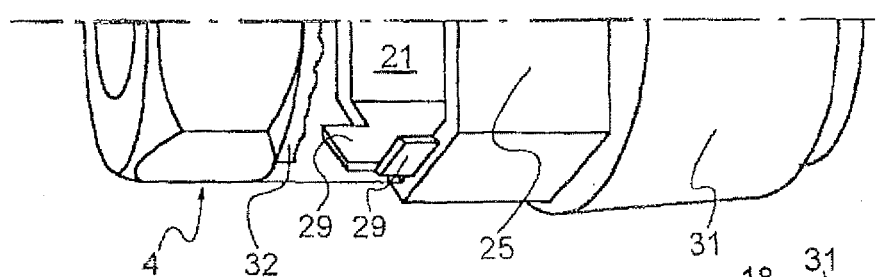
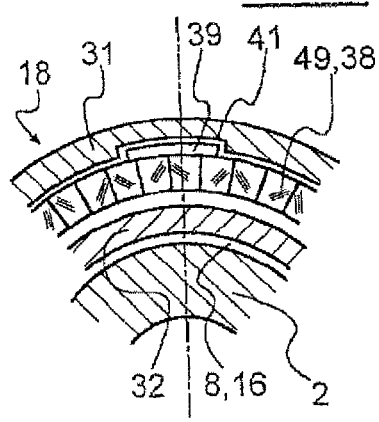
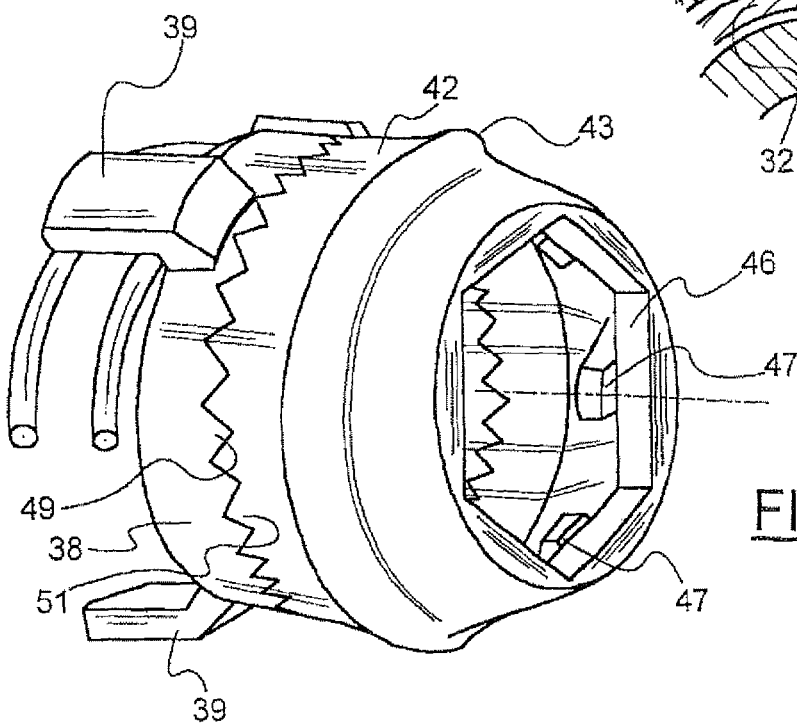

LOCKING DEVICE AND A LINE FITTING PROVIDED THEREWITH

BACKGROUND OF THE INVENTION

1. Field of the Invention

This invention relates to a locking device for two components which are in a mutual screw connection.

This invention also relates to a pipe coupling provided with such a device.

The function of the locking device is to prevent undesirable unscrewing of the two components from each other, in particular in applications where the two components are subject to vibrations or shaking during use.

The invention is more particularly but not limitatively aimed at standardized couplings comprising a nipple at the end of one of the pipes, intended to be pressed into a flaring of the end of the other pipe, by tightening a nut captively mounted on one of the pipes and engaging a thread formed on the other pipe.

2. Description of Related Art

U.S. Pat. No. 6,293,595 B1 describes such a locking device capable of simultaneously engaging, by an axial movement under pressure from a spring, the hexagonal formation of the nut and a stop component integral with the male end-portion of the pipe. In order to be able to separate the two pipe end-portions, the coupling component must be pushed back against the return spring to the position where it is disconnected from the hexagonal formation provided on the nut and/or from the stop component attached to the male end-portion of the pipe.

During screwing or unscrewing, the presence of the tool on the nut prevents the coupling component from returning to the locking position. As soon as the tool is withdrawn when the screwing operation is completed, the coupling component is free to move to the locking position through the action of the spring.

This known device has the considerable advantage of being able to be adapted to a standard pipe coupling without modifications other than merely securing a bearing element on the male end-portion of the coupling.

In certain applications, where accessibility is difficult, in particular in aeronautics, it is desirable to minimize the interference caused by the locking device. With the known device, if the nut resists the unscrewing force exerted by the operator, the operator, who cannot see the nut, does not know whether the resistance is due to the screwing connection itself or to an incorrect disengagement of the coupling component. Moreover, and in any case, he must remember the structure of the locking device in order to displace his tool axially along the hexagonal formation thereby to push the coupling component back before being able to perform the unscrewing operation strictly speaking.

BRIEF SUMMARY OF THE INVENTION

The object of this invention is to improve the known locking device in terms of ease of use.

According to the invention, the locking device for a screw coupling comprising a first and a second component which are rotatable in relation to one another during the screwing, a first of the components comprising a first thread and a rotating engagement formation distant from this first thread, the locking device being mounted on the second component and comprising:

a coupling component for coupling with the engagement formation, a stop component firmly connected for common rotation with a body carried by the second component, disconnectable coupling means between the coupling component and the stop component, is characterized in that the coupling means are of the type with a ratchet allowing relative rotation in the direction of unscrewing when a predetermined spring resistance is overcome.

According to the invention it has been found that a reversible ratchet system is very effective for preventing any unscrewing as a result of vibrations. The ratchet only disconnects the two components from one another when a spring resistance has been overcome over a sufficient angular distance to reach the point passing over the apex of a ratchet tooth. However the vibratory excitation in one direction or in the other is of too short a duration for this process of passing over the tooth apex to be possible. The process can certainly begin, but it is followed by a springing back to the most stable locking situation.

By contrast, when an intentional unscrewing is carried out, the operator is not subjected to any feeling of malfunction or disturbance.

The unscrewing is therefore possible without the operator having to undertake special precautions or actions. He need only engage his tool with the hexagonal or other engagement formation provided on the first component of the screw coupling, and actuate his tool as usual.

The locking device according to the invention can be designed to be entirely compatible with standard pipe couplings without these requiring modifications other than fixing the device body onto the second component. Preferably, it is the nut which constitutes the second component. It is in fact easier to produce a special nut, in particular in the case of subsequent fitting. Moreover if the nut is equipped with the device, the two end-portions can be completely cleared when they are in the uncoupled state, simply by sliding the nut far enough back along the pipe which carries it, and the locking device no longer forms any obstruction to moving a pipe laterally in relation to the other.

According to a second aspect of the invention, the pipe coupling comprising a pipe end-portion provided with an external thread and a nut which can be screwed onto the external thread and rotatably mounted on another pipe end-portion, is characterized in that it also comprises a locking device according to the first aspect, for selectively locking the relative rotation of the two components constituted by the nut and the end-portion provided with an external thread.

Other features and advantages of the invention will also become apparent in the following description, which relates to non-limitative examples.

BRIEF DESCRIPTION OF THE DRAWINGS

In the attached drawings:

FIG. 2 is a perspective half-view of the locking device and of a part of the nut before mounting the device on the nut, the first variant for the means of securing the locking device onto the nut being illustrated;

FIG. 2A is another perspective half-view of the locking device and of a part of the nut before mounting the device on the nut, the second variant for the means of securing the locking device onto the nut being illustrated;

FIG. 3 is a partial sectional view along line III-III of FIG. 1;

FIG. 4 is a perspective view of the coupling and stop components, as well as of a part of the spring.

DETAILED DESCRIPTION OF THE PREFERRED EMBODIMENTS

Figure 1:
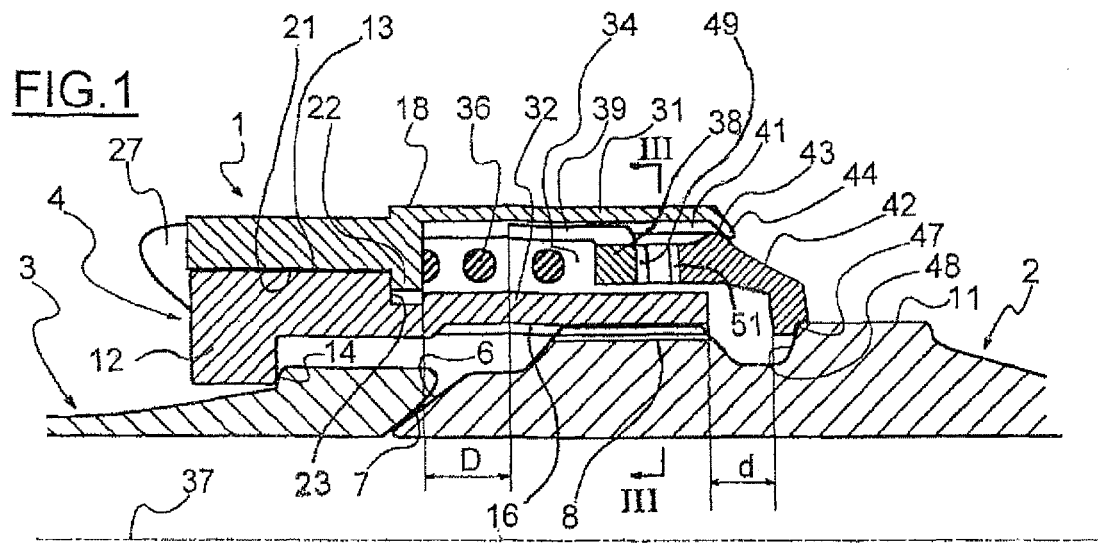
FIG. 1 is an axial sectional half-view of a pipe coupling according to the invention in the locking position, a first variant being illustrated for the means of securing the locking device onto the nut.
Figure 1A:
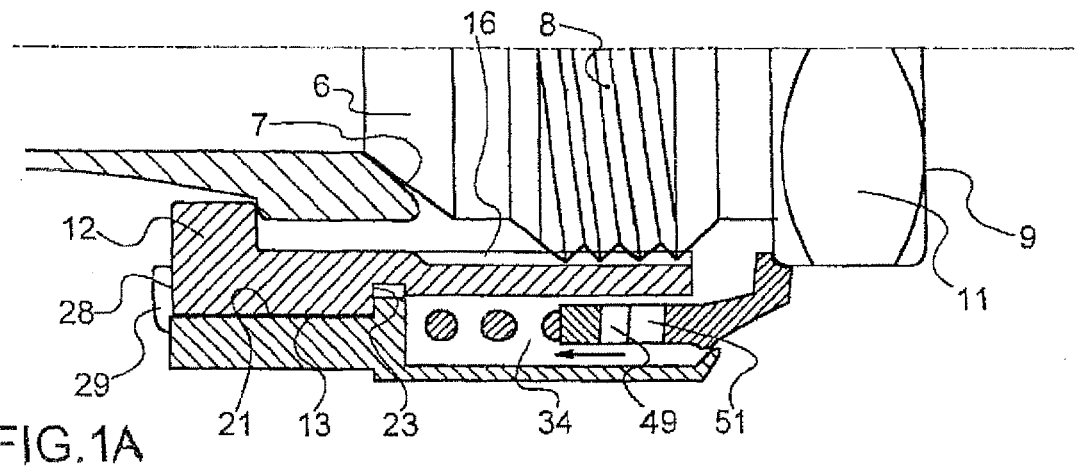
FIG. 1A is a view similar to FIG. 1, but showing the other half of the pipe coupling according to the invention, and in the unlocking position at the start of unscrewing or at the end of screwing, a second variant being illustrated for the means of securing the locking device onto the nut.

As shown in FIGS. 1 and 1A, the locking device 1 according to the invention can be adapted to a first pipe coupling comprising a male end-portion 2- or nipple-, firmly attached to a first one of the pipes to be coupled, and a female end-portion 3, which is firmly attached to the second one of the pipes to be coupled, as well as a nut 4.

The end-portions 2 and 3 comprise at their free end a male seal formation, with an ovoid shape 6 and respectively a female seal formation 7, with a frusto-conical shape, intended to leak-tightly bear on one another. Starting from the ovoid seal formation 6, the nipple 2 comprises an external thread 8 then a flange 9 provided on its periphery with a rotational engagement formation such as a hexagonal formation 11. The formation is distant or separated from the thread 8 of the component 2 in the sense that this formation 11 which will be used for the locking is not constituted by an alteration of the thread such as a flat section or a groove eliminating part of the threads.

The nut 4 comprises at its rear end, remote from the end-coupling 2, an internal flange 12 and an external rotational engagement formation 13 such as a hexagonal formation. The internal flange 12 is behind and engages a shoulder 14 of the end-portion 3. The shoulder 14 faces away from the end-portion 2 in order to retain the nut 4 in a captive condition and in order to receive from the nut 4 a force which causes the seal formation 7 to leak-tightly engage the seal formation 6 of the end-portion 2.

The nut 4 is extended forwardly by a tube 32 which comprises starting from its front end turned towards the end-portion 2 an internal thread 16 capable of cooperating with the thread 8 of the end-portion 2 in order to produce the above-mentioned tightening pressure.

The locking device 1 according to the invention comprises a support body 18—or cup—comprising at its rear end a sleeve 19 which is fitted around the hexagonal formation 13 of the nut 4. To this effect, the sleeve 19 comprises an internal surface 21 having a prismatic shape with a hexagonal contour which allows the sleeve 19 to be fitted, with practically no play, onto the hexagonal formation 13 (see also FIG. 2). Once this fitting has been carried out, the nut 4 and the body 18 are connected for common rotation. Moreover, the sleeve 19 is equipped with retaining means for axially attaching the sleeve 19 and therefore the body 18 to the nut 4. These means comprise at the annular inner end of the surface 21 an internal flange 22 (FIG. 1) intended to abut a front shoulder 23 of the nut 4, said shoulder adjacent to the front edge of the formation 13. In the version represented in FIGS. 1 and 2, the retaining means also comprise locking lugs 24 cut out in the wall of the sleeve 19 with essentially axial slits 26 opening though the rear edge of the sleeve 19. The locking lugs 24 end in locking jaws 27 which, once assembling is completed, grasp the rear face 28 of the nut 4, adjacent the rear annular edge of the hexagonal formation 13.

In the embodiment shown in FIGS. 1A and 2A, the retaining means comprise crimping tabs 29 which are initially in the extension of at least some of the faces of the inner surface 21 of the sleeve 19 (FIG. 2A). Once assembling is completed, the tabs 29 are plastically bent back against the rear surface 28 of the nut 4, as shown at the bottom of FIG. 1.

The sleeve 19 has on its external surface its own hexagonal formation 25 intended to substitute for the hexagonal formation 13 of the nut in order to allow the nut to be rotated using a tool such as a wrench (not represented) when the device 1 is in place.

At its front end, the sleeve 19 is rigidly connected to and forms a single piece with the rear end of a generally cylindrical skirt 31 which extends around the tube 32 while forming an annular chamber 34 between the skirt 31 and the tube 32.

Inside the chamber 34 there is, starting from the rear end thereof, a helical compression spring 36 having the same axis 37 as the pipe, an annular stop component 38 around the axis 37 and comprising blocks 39 slidingly mounted in axial grooves 41 of the internal wall of the skirt 31, and finally a coupling component 42 comprising on its external periphery a boss 43 which prevents the coupling component 42 from disengaging from the skirt 31. To this effect, the boss 43 abuts a terminal rim 44 of the skirt 31, formed by plastic deformation, projecting radially towards the axis 37.

As particularly shown in FIG. 4, the coupling component 42 protrudes outside the skirt 31 beyond the terminal rim 44 and has in its front portion, which protrudes from the skirt 31 at least when the spring 36 is in the state of relatively low compression, a hexagonal female recess 46 with a size corresponding to that of the male hexagonal formation 11 of the first component 2. The axial width of this recess is much smaller than that of the hexagonal formation 11 and it is delimited, at its rear end, by stops 47 intended to engage a shoulder 48 adjacent the hexagonal formation 11. This engagement limits the axial extent by which the recess 46 covers the formation 11.

The axial dimensioning of the assembly is such that when the two end-portions 2, 3 in a new condition (FIG. 1) are leak-tightly pressed axially against one another by the clamping exerted by the nut 4, the coupling component 42 engages the hexagonal formation 11, the stops 47 engage the shoulder 48 while the stop 43 is almost bearing against the rim 44.

Figure 5:
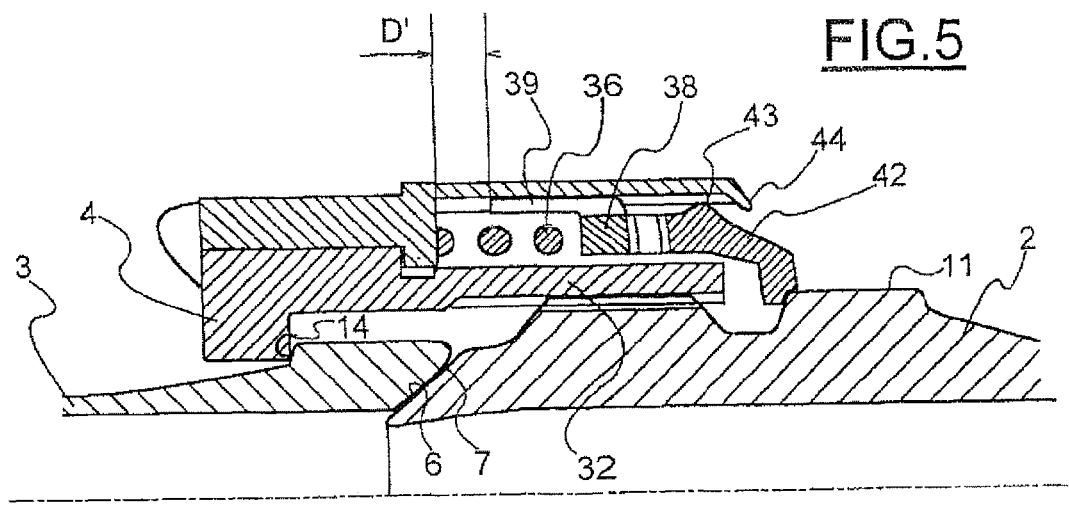
FIG. 5 is a view similar to the upper half-view of FIG. 1, but in the case of a worn pipe coupling.

As illustrated in FIG. 5, the generic type pipe couplings addressed by the invention tend to become worn by radial contraction of the male part 6, and widening or flaring out of the frusto-conical part 7. This results in an increase in the travel of the nut 4 along the first component 2 which is necessary in order for the desirable axial clamping to be achieved. This is allowed for according to the invention by means of a sufficient compression displacement of the spring 36, and sufficient initial axial mobility distances d (FIG. 1) between the coupling component 42 and the free end of the nut 4, and D between the rear end of the blocks 39 and the bottom of the chamber 34.

The stop component 38 and the coupling component 42 have on their annular edges turned towards one another teeth 49, 51 pointing axially and having a symmetrical profile. In other words, in relation to a circumferential direction, the teeth, which have a triangular configuration, each have a front face and a rear face which have the same oblique slope. Moreover, the teeth 49 of the stop component 38 and the teeth 51 of the coupling component 42 have complementary profiles so that they can interpenetrate as represented in FIG. 1 and in FIGS. 4 and 5. By contrast, in FIG. 1A, the teeth are tip to tip.

It is very easy to provide a pipe coupling with the locking device according to the invention. The nut being completely separate from the first component 2, and the latter being separate from the second component 3, the device 1 is fitted onto the nut 4 from the front end of the nut 4 until the flange 22 abuts against the shoulder 23. In the self-locking embodiment, the lugs 24 are forced radially outwards in order to pass the shoulder 23 then resiliently spring back inwardly when the jaws 27 can snap behind the face 28 of the nut 4. In the version with crimping tabs 29, the fitting is carried out without resistance until the flange 22 abuts the shoulder 23. At this stage, the crimping tabs 29 are bent back radially inwardly as represented at the bottom of FIG. 1. It is noteworthy that the device 1 forms an assembly all in one piece being entirely mounted on only one of the components to be locked together, without requiring any arrangement on the other component.

In order to couple the pipe coupling, the nut 4 is screwed around the thread 8 of the end-portion 2 using a wrench which engages the hexagonal formation 11 of the end-portion 2 and another wrench which engages the hexagonal formation 25 of the device 1. The coupling component 42 abuts the edge 44 through the action of the compression spring 36. As the end of screwing approaches, the coupling component 42 abuts the shoulder 48 of the end-portion 2, the spring 36 starts to compress and then, as the component 42 is driven in rotation by the interpenetration of the teeth 49 and 51, its recess 46 ends up matching with the formation 11 of the end-portion 2 and the spring 36 springs back while causing the recess 46 to fit onto the formation 11. The coupling component 42 is consequently prevented from turning with the nut 4 and the teeth 49 and 51 click one on another, each time with a brief compression of the spring 36 when the teeth 49 and 51 are tip to tip as illustrated in FIG. 1A. Finally the situation represented in FIG. 1 is reached, where the pipe is locked and leak-tight, and the nut 4 is prevented from turning under the effect of vibrations or other parasitic loads thanks to the locking of the nut 4 and the end-portion 2 via the body 18, the stop component prevented from turning in relation to the body 18 thanks to the blocks 39 engaged in the grooves 41, and the coupling component 42 prevented from turning in relation to the stop component 38 because of the interpenetration of the teeth 49 and 51. If the rotation of the nut at the end of locking ends at a position where the teeth 49 and 51 are tip to tip as represented in FIG. 1A, any stress, vibratory or otherwise, can then only result in a slight turn of the nut until the situation of interpenetration of the teeth is achieved.

In order to unscrew the nut, it is sufficient to again position the two tools on the hexagonal formations 25 and 11, and to make the device 1 and the nut 4 turn together in the direction of the unscrewing. The teeth and 51 jump one above the other with brief compressions of the spring 36 until, as a result of the axial backward movement of the nut 4 associated with the unscrewing movement, the coupling component 42 ends up being disengaged from the hexagonal formation 11 of the end-portion 2. The coupling component 42 now turns with the nut 4 in the unscrewing direction. Once unscrewing is completed, the nut 4 and the device 1 can move together as far as desired rearwardly (therefore towards the left side of FIGS. 1 and 1A) in order to allow the desired technical operation to be carried out on the coupling without any interference.

When the coupling is worn, the residual spring compression travel of the spring 36 and the distance D' (FIG. 5) still allowed for the blocks 39 in the locked state are sufficient to allow the teeth 49 and 51 to pass each other by a ratchet movement.

Of course, the invention is not limited to the examples described and represented.

The device could also be attached to the male end-portion 2 and be caused to cooperate, for locking, with the hexagonal formation 13 of the nut. This solution is less preferred because the device may then prevent good access to the components of the coupling such as the male and female end-portions even after unscrewing is completed.

If it is sought to have a different resistance of the teeth 49 and 51 when screwing and unscrewing, they can be made asymmetrical but they must always have a sufficiently small slope to be able to pass each other simply by the action of a turning torque exerted on the locking device 1 in relation to the other component which is not equipped with the device.

It is also possible to produce pipe coupling components, and in particular nuts which are directly equipped with a device according to the invention, in which case the body 18 and the nut 4 can simply constitute one and the same part, or for example two parts assembled together in a permanent fashion, by welding or bonding, etc.

The invention claimed is:

1. A screw coupling including a locking device, said screw coupling comprising first and second components rotatable in relation to one another during screwing and unscrewing, the first component comprising a first thread and a rotating engagement formation distant from the first thread, the locking device being mounted on the second component and comprising:
    a coupling component for coupling with the engagement formation,
    a stop component connected for common rotation with a body carried by the second component, the body connected for common rotation with the second component, and
    disconnectable coupling means between the coupling component and the stop component,
    wherein the disconnectable coupling means comprises a ratchet allowing relative rotation in the direction of unscrewing when a torque at least indirectly applied to the coupling component and the stop component with respect to one another overcomes a predetermined elastic resistance, the torque between the coupling component and the stop component resulting from a torque applied between the first component and the body.

2. The screw coupling according to claim 1, wherein the disconnectable coupling means comprises axially pointing teeth formed on the coupling component and on the stop component, which are urged towards one another by a spring in the direction of teeth interpenetration.

3. The screw coupling according to claim 2, wherein the coupling and stop components are axially movable in relation to the body and are commonly urged by the spring towards a stop provided in the body for the coupling component.

4. The screw coupling according to claim 2, wherein the coupling component can be drawn back against the spring and comprises a stop for engagement of a shoulder of the first component in order to limit the axial extent by which the coupling component is able to cover the engagement formation.

5. The screw coupling according to claim 1, wherein the coupling component can be drawn back against a spring and comprises a stop for engagement of a shoulder of the first component in order to limit the axial extent by which the coupling component is able to cover the engagement formation.

6. The screw coupling according to claim 1, wherein the body is formed as a cup enclosing the stop component and partially enclosing the coupling component.

7. The screw coupling according to claim 1, wherein the stop component and the coupling component are mounted around a tube of the second component, which is internally threaded for screwing with the first component.

8. The screw coupling according to claim 1, wherein the body can be fitted onto a second engagement formation integral with the second component and the body having an engagement formation which can be used in place of the second engagement formation in order to carry out the relative rotation of the first and second components by means of tools.

9. The screw coupling according to claim 1, wherein the body is secured onto the second component by snap-fit.

10. The screw coupling according to claim 1, wherein the body is secured onto the second component by crimping.

11. The screw coupling according to claim 1, wherein the locking device is adapted to be mounted as a single unit onto the second component.

12. The screw coupling according to claim 1, being entirely mounted on the second component.

13. A pipe coupling comprising a first pipe end-portion provided with an external thread, a second pipe end-portion, a nut which is rotatably mounted on the second pipe end-portion and can be screwed on the external thread of the first pipe end-portion, and a locking device for selectively locking against relative rotation the nut and the first pipe end-portion provided with the external thread, the locking device being mounted on the second pipe end-portion and comprising:
- a coupling component for coupling with an engagement formation formed on the first pipe end-portion distant from the external thread,
- a stop component for common rotation with a body carried by the nut, the body connected for common rotation with the nut, and
- disconnectable coupling means between the coupling component and the stop component,
- wherein the disconnectable coupling means comprises a ratchet allowing relative rotation in the direction of unscrewing when a torque at least indirectly applied to the coupling component and the stop component with respect to one another overcomes a predetermined elastic resistance, the torque between the coupling component and the stop component resulting from a torque applied between the first pipe end-portion and the body.

14. The pipe coupling according to claim 13, wherein the first and the second pipe end-portions and the nut are standard non-modified components.

* * * * *